United States Patent
Kudo (10) Patent No.: US 10,859,376 B2
(45) Date of Patent: Dec. 8, 2020

(54) INFORMATION PROCESSING APPARATUS, INFORMATION PROCESSING METHOD, AND NON-TRANSITORY COMPUTER READABLE RECORDING MEDIUM

(71) Applicant: MITUTOYO CORPORATION, Kanagawa (JP)

(72) Inventor: Yuji Kudo, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 299 days.

(21) Appl. No.: 15/435,924

(22) Filed: Feb. 17, 2017

(65) Prior Publication Data

US 2017/0248419 A1    Aug. 31, 2017

(30) Foreign Application Priority Data

Feb. 25, 2016   (JP) ................................. 2016-034780
Dec. 22, 2016   (JP) ................................. 2016-249557

(51) Int. Cl.
| | |
|---|---|
| *G01B 21/20* | (2006.01) |
| *G01B 11/06* | (2006.01) |
| *G01B 5/00* | (2006.01) |
| *G01B 21/04* | (2006.01) |
| *G01B 11/24* | (2006.01) |
| *G01B 5/12* | (2006.01) |
| *G01B 5/06* | (2006.01) |
| *G01B 11/12* | (2006.01) |

(Continued)

(52) U.S. Cl.
CPC ............. *G01B 21/20* (2013.01); *G01B 5/003* (2013.01); *G01B 5/061* (2013.01); *G01B 5/12* (2013.01); *G01B 11/0608* (2013.01); *G01B 11/12* (2013.01); *G01B 11/2441* (2013.01); *G01B 11/303* (2013.01); *G01B 21/04* (2013.01); *G01M 15/042* (2013.01)

(58) Field of Classification Search
CPC ................................ G01B 21/20; G01B 5/061
USPC ......................................................... 702/167
See application file for complete search history.

(56) References Cited

U.S. PATENT DOCUMENTS

| | | | |
|---|---|---|---|
| 2004/0083073 A1* | 4/2004 | Sasaki | ..................... G01B 5/20 |
| | | | 702/117 |
| 2011/0231129 A1 | 9/2011 | Yanai | |

(Continued)

FOREIGN PATENT DOCUMENTS

| | | |
|---|---|---|
| CN | 102194725 A | 9/2011 |
| CN | 104942374 A | 9/2015 |

(Continued)

OTHER PUBLICATIONS

Office Action issued in Chinese family member Patent Appl. No. 201710107340.8, dated Dec. 17, 2019 and English translation thereof.

(Continued)

*Primary Examiner* — Eman A Alkafawi
(74) *Attorney, Agent, or Firm* — Greenblum & Bernstein, P.L.C.

(57) ABSTRACT

Provided is an information processing apparatus including: an input unit into which shape data of a surface to be measured including a plurality of recesses is input; and a setting unit that detects each of the plurality of recesses on the basis of the input shape data and sets, for the detected recess, a region to be removed including the recess.

14 Claims, 10 Drawing Sheets

(51) Int. Cl.
*G01B 11/30* (2006.01)
*G01M 15/04* (2006.01)

(56) References Cited

U.S. PATENT DOCUMENTS

| | | | | |
|---|---|---|---|---|
| 2011/0288819 | A1* | 11/2011 | Harrison | F42B 35/00 702/168 |
| 2012/0160217 | A1* | 6/2012 | Ashizawa | F02B 21/00 123/48 D |
| 2015/0106056 | A1* | 4/2015 | Umegaki | G01B 11/22 702/167 |
| 2015/0276393 | A1* | 10/2015 | Nishikawa | G05B 19/4097 29/888.06 |
| 2017/0370714 | A1* | 12/2017 | Sato | G01B 21/042 |
| 2018/0003491 | A1* | 1/2018 | Sabelli | G01B 21/042 |

FOREIGN PATENT DOCUMENTS

| | | |
|---|---|---|
| CN | 105300324 A | 2/2016 |
| JP | 2004-077383 A | 3/2004 |
| JP | 2005-144475 A | 6/2005 |
| JP | 2007-057344 A | 3/2007 |
| JP | 2010-210576 A | 9/2010 |

OTHER PUBLICATIONS

Office Action issued in Chinese Counterpart Patent Appl. No. 201710107340.8, dated Aug. 13, 2020, along with an English translation thereof.

Office Action issued in Japanese Counterpart Patent Appl. No. 2016-249557, dated Sep. 1, 2020, along with an English translation thereof.

* cited by examiner

INFORMATION PROCESSING APPARATUS, INFORMATION PROCESSING METHOD, AND NON-TRANSITORY COMPUTER READABLE RECORDING MEDIUM

CROSS REFERENCE TO RELATED APPLICATIONS

This application claims the benefit of Japanese Priority Patent Application JP 2016-034780 filed Feb. 25, 2016, and Japanese Priority Patent Application JP 2016-249557 filed Dec. 22, 2016, the entire contents of each of which are incorporated herein by reference.

BACKGROUND

The present technology relates to an information processing apparatus applicable for measuring an inner wall of an engine cylinder, for example, an information processing method, and a non-transitory computer readable recording medium.

In developing and producing automobile engines and the like, it is very important to observe, inspect, and analyze a cylinder inner wall of a cylinder block. For example, Japanese Patent Application Laid-open No. 2007-57344 (hereinafter, referred to as Patent Document 1) has disclosed an inspecting method. In this inspecting method, distribution and volume of protrusions formed in a cylinder inner wall for reducing friction against pistons are calculated and the cylinder inner wall is inspected on the basis of the calculated distribution and volume (specification paragraph [0018], FIG. 1, etc. of Patent Document 1).

Moreover, as described in Japanese Patent Application Laid-open No. 2005-144475 (hereinafter, referred to as Patent Document 2), oil pits that function as holes in which engine oil is received are formed in a bore inner circumferential surface (cylinder inner wall) of a cylinder block. With this, an amount of oil that enables an oil film to be formed against the pistons is retained, which can reduce a sliding resistance between the cylinder inner wall and the pistons (specification paragraphs [0002] and [0016], FIG. 1, etc. of Patent Document 2).

SUMMARY

For the inner wall of the cylinder surface in which those oil pits and the like are formed, a technology that enables a surface profile to be highly accurately measured is desirable.

In view of the above-mentioned circumstances, there is a need for providing an information processing apparatus capable of highly accurately measuring a surface profile of a surface to be measured in which recesses such as oil pits are formed, an information processing method, and a non-transitory computer readable recording medium.

According to an embodiment of the present technology, there is provided an information processing apparatus including an input unit and a setting unit.

Into the input unit, shape data of a surface to be measured including a plurality of recesses is input.

The setting unit detects each of the plurality of recesses on the basis of the input shape data and sets, for the detected recess, a region to be removed including the recess.

In this information processing apparatus, each of the plurality of recesses is detected and the region to be removed is set for each recess. This enables surface roughness of a region excluding the recesses to be highly accurately measured as a surface profile of the surface to be measured.

The setting unit may set the region to be removed on the basis of an area of the detected recess.

Setting the region to be removed corresponding to the area of the recess enables surface roughness of a region excluding the recesses to be highly accurately measured.

The setting unit may set a reference graphic figure having an area approximately equal to the area of the detected recess and set the region to be removed on the basis of a dimension of the reference graphic figure.

This enables the region based on the size of the recess to be set as the region to be removed. Thus, it becomes possible to enhance the measurement accuracy for the surface roughness.

The setting unit may set, as the region to be removed, a region obtained by enlarging the recess on the basis of an amount of enlargement that is a difference between the dimension of the reference graphic figure and a multiplication value obtained by multiplying a predetermined enlargement ratio by the dimension of the reference graphic figure.

This enables the region obtained by enlarging the recess at an appropriate ratio to be set the region to be removed. Thus, it becomes possible to enhance the measurement accuracy for the surface roughness.

The reference graphic figure may be a circle having an area approximately equal to the area of the detected recess, and the dimension may be a diameter of the circle.

This enables the region to be removed based on the size of the recess to be easily set. Thus, it becomes possible to enhance the measurement accuracy for the surface roughness.

The reference graphic figure may be a rectangle having a width approximately equal to a width of the recess, and the dimension may be a width dimension of the rectangle.

This enables the region to be removed based on the size of the recess to be easily set. Thus, it becomes possible to enhance the measurement accuracy for the surface roughness.

The setting unit may set the region to be removed such that a multiplication value obtained by multiplying a predetermined enlargement ratio by the area of the detected recess is approximately equal to an area of the region to be removed.

This enables the region obtained by enlarging the recess at the predetermined enlargement ratio to be set as the region to be removed. Thus, it becomes possible to enhance the measurement accuracy for the surface roughness.

The setting unit may set a reference height to the shape data of the surface to be measured and detect, as the recess, a portion whose height is smaller than the reference height by a predetermined threshold or more.

This enables the recess to be detected with high accuracy.

The setting unit may develop the input shape data into a plane, set the reference height to the developed shape data, and detect the recess.

For example, when the surface to be measured is an inner wall or the like of a cylinder or the like, developing the shape data into the plane enables the recess to be detected with high accuracy.

The reference height may be a mean height of the surface to be measured, which is calculated on the basis of the shape data.

This enables a portion whose height is smaller than the mean height by the predetermined threshold or more to be accurately detected as the recess.

The surface to be measured including the plurality of recesses may be an inner wall of a cylinder surface including a plurality of pits.

With this, it becomes possible to highly accurately measure surface roughness of the plurality of pits of the region excluding the inner wall of the cylinder surface.

The surface to be measured including the plurality of recesses may be an inner wall of a cylinder surface in which cross-hatched grooves are formed.

With this, it becomes possible to highly accurately measure surface roughness of a region excluding the cross-hatched grooves of the inner wall of the cylinder surface.

The information processing apparatus may further include a measuring unit that measures surface roughness of a region excluding the set region to be removed.

This enables surface roughness of a region excluding the recesses to be highly accurately measured as the surface profile of the surface to be measured.

According to an embodiment of the present technology, there is provided an information processing method that is executed by a computer, the method including acquiring shape data of a surface to be measured including a plurality of recesses.

Each of the plurality of recesses is detected on the basis of the acquired shape data and a region to be removed including the recess is set for the detected recess.

According to an embodiment of the present technology, there is provided a non-transitory computer readable recording medium that records a program that causes a computer to execute the steps of:

acquiring shape data of a surface to be measured including a plurality of recesses; and detecting each of the plurality of recesses on the basis of the acquired shape data and setting, for the detected recess, a region to be removed including the recess.

As described above, in accordance with the embodiments of the present technology, it is possible to highly accurately measure the surface profile of the surface to be measured in which the recesses such as the oil pits are formed. It should be noted that the effects described here are not necessarily limitative and may be any effects described in the present disclosure.

DETAILED DESCRIPTION OF EMBODIMENTS

Hereinafter, an embodiment of the present technology will be described with reference to the drawings.

[Configuration of Inner-Wall Measurement Apparatus]

Figure 1:
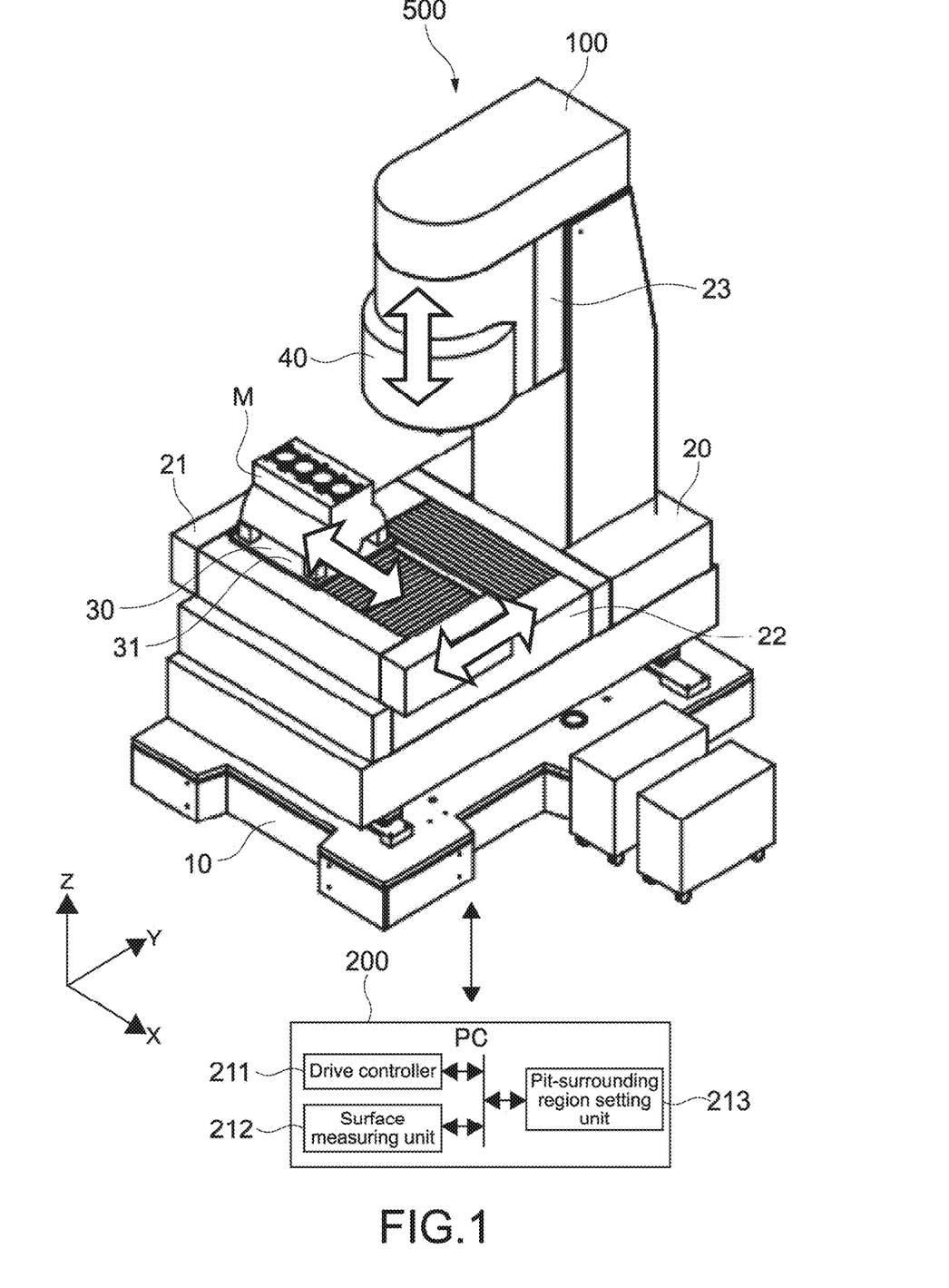
FIG. 1 is a diagram schematically showing an outer appearance of an inner-wall measuring instrument according to an embodiment.
Figure 2:
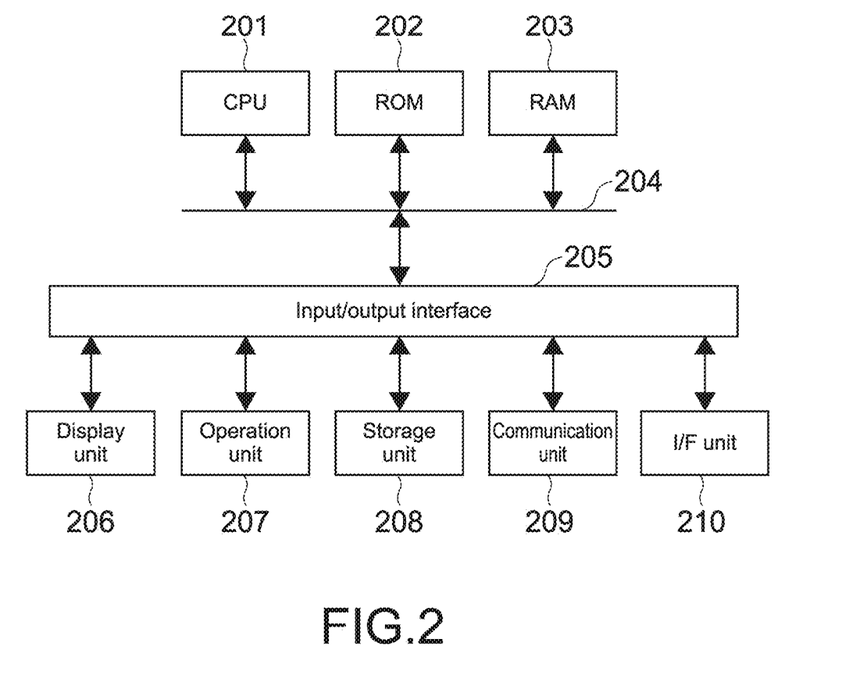
FIG. 2 is a schematic diagram showing a hardware configuration example of a PC shown in FIG. 1.

FIG. 1 is a diagram schematically showing an outer appearance of an inner-wall measuring instrument according to the embodiment of the present technology. FIG. 2 is a schematic diagram showing a hardware configuration example of a PC (Personal Computer) that functions as the information processing apparatus according to this embodiment. Note that a computer other than the PC may be used.

As shown in FIG. 1, the inner-wall measuring instrument 500 includes a three-dimensional coordinate measuring device 100 and a PC 200. The three-dimensional coordinate measuring device 100 includes a base section 10, a three-axis movement mechanism 20, a stage 30, a head cover 40, and a probe head 50 (see FIG. 3). The three-axis movement mechanism 20 is supported by the base section 10.

The three-axis movement mechanism 20 includes an X-axis movement mechanism 21, a Y-axis movement mechanism 22, and a Z-axis movement mechanism 23. The X-axis movement mechanism 21 supports the stage 30 to be movable in an X-direction. The Y-axis movement mechanism 22 supports the X-axis movement mechanism 21 to be movable in a Y-direction. The Z-axis movement mechanism 23 moves the head cover 40 and the probe head 50 in a Z-direction.

The three-axis movement mechanism 20 is controlled by the PC 200, and hence the probe head 50 can perform scanning in a measurement coordinate section formed of three axes of XYZ. That is, it is possible to relatively move the probe head 50 with respect to an object to be measured M placed on the stage 30 in three axis directions of XYZ orthogonal to one another.

Specific configurations of the X-axis movement mechanism 21, the Y-axis movement mechanism 22, and the Z-axis movement mechanism 23 are not limited. Moreover, any configuration may be employed for a configuration of the three-axis movement mechanism 20 as long as the three-axis movement mechanism 20 can cause the probe head 50 to perform scanning in each of the X-, Y-, and Z-directions.

The three-dimensional coordinate measuring device 100 is provided with position detection mechanisms (not shown) such as linear encoders for the X-, Y-, and Z-directions. The position detection mechanisms output data to the PC 200. This data relates to relative displacement and position of the probe head 50 with respect to the object to be measured M.

The stage 30 includes a placement surface 31 parallel to a horizontal direction (XY-plane direction). The object to be measured M is placed on the placement surface 31. In this embodiment, a cylinder block, which is incorporated in an automobile or the like, is placed on the placement surface 31 as the object to be measured M. The inner wall of the cylinder provided in the cylinder block can be measured by controlling the probe head 50 covered with the head cover 40. The probe head 50 will be described later in detail.

As shown in FIG. 2, the PC 200 includes a central processing unit (CPU) 201, a read only memory (ROM) 202, a random access memory (RAM) 203, an input/output interface 205, and a bus 204 that connects to one another. A display unit 206, an operation unit 207, a storage unit 208, a communication unit 209, an I/F (interface) unit 210, and the like are connected to the input/output interface 205.

The display unit 206 is, for example, a display device using liquid-crystal, electro-luminescence (EL), or the like. The operation unit 207 is, for example, a keyboard, a pointing device, a touch panel (structure integral with the display unit 206), or another operating instrument. The storage unit 208 is a nonvolatile storage device. For example, a hard disk drive (HDD) is used for the storage unit 208.

The communication unit 209 is a communication module for communicating with other devices via a network such as a local area network (LAN) and a wide area network (WAN). A communication module for short-distance wireless communication such as Bluetooth (registered trademark) may be provided. Moreover, a communication device such as a modem and a router may be used.

The I/F unit 210 is an interface to which other devices such as a universal serial bus (USB) terminal and a high-definition multimedia interface (HDMI) (registered trademark) and various cables are connected. The display unit 206, the operation unit 207, the communication unit 209, or the like may be connected to the PC 200 via the I/F unit 210.

In this embodiment, the three-dimensional coordinate measuring device 100 and the PC 200 are connected to each other via the communication unit 209 or the I/F unit 210 with or without wire(s). Thus, shape data of the surface to be measured is input into the PC 200 from the three-dimensional coordinate measuring device 100 via those blocks.

Information processing of the PC 200 can be performed, for example, when the CPU loads a predetermined program stored in the ROM 202, the storage unit 208, or the like into the RAM 203 and executes it. As shown in FIG. 1, in this embodiment, a drive controller 211, a surface measuring unit 212, and a pit-surrounding region setting unit 213 are configured by the CPU 201 executing a predetermined program. Dedicated hardware may be used for configuring those blocks.

The drive controller 211 controls driving of the mechanisms inside the three-dimensional coordinate measuring device 100. The surface measuring unit 212 measures, on the basis of measurement data or the like output from the three-dimensional coordinate measuring device 100, a surface profile or the like of the object to be measured M. In this embodiment, surface roughness of a region excluding a pit-surrounding region set by the pit-surrounding region setting unit 213 is measured. The pit-surrounding region is a region including an oil pit and its periphery. In this embodiment, the pit-surrounding region corresponds to a region to be removed. A setting of the pit-surrounding region will be described later in detail.

Programs are installed in the PC 200 via various recording media, for example. Alternatively, programs may be installed in the PC 200 via the Internet or the like. Note that a computer other than the PC may be used as the information processing apparatus according to this embodiment.

Figure 3:
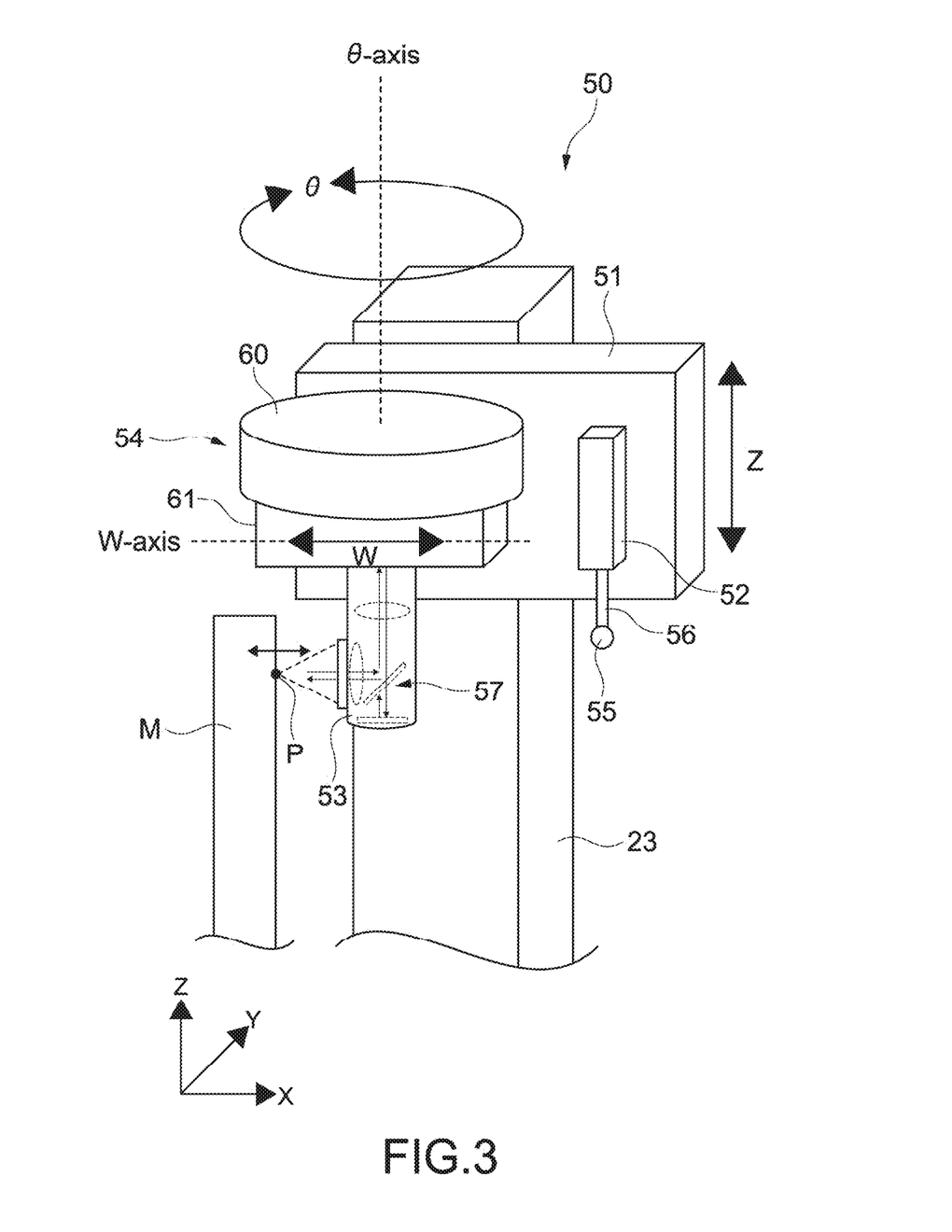
FIG. 3 is a schematic diagram showing an exemplary configuration of a probe head portion.

FIG. 3 is a schematic diagram showing an exemplary configuration of the probe head 50. The probe head 50 includes a base 51, the touch probe 52, the image probe 53, and a probe supporting mechanism 54. The base 51 is connected to the Z-axis movement mechanism 23 and moved in the Z-direction. When the base 51 is moved, the touch probe 52, the image probe 53, and the probe supporting mechanism 54 are also moved together.

The touch probe 52 is attached to the base 51 such that a stylus 56 including a tip ball 55 extends in the Z-direction. The touch probe 52 performs scanning on the object to be measured M and XYZ-coordinate information obtained when the contact of the object to be measured M with the tip ball 55 is calculated. On the basis of the calculation result, the shape, the height, or the like of the object to be measured M is measured. A specific configuration of the touch probe 52 is not limited and any touch probe may be used.

The image probe 53 is attached to the base 51 via the probe supporting mechanism 54. In this embodiment, a white light interferometer is used as the image probe 53. Thus, as shown in FIG. 3, a white light interferometric optical system 57 is configured inside the image probe 53. Note that the present technology is applicable even when a probe other than the white light interferometer is used as the image probe 53.

The white light interferometric optical system 57 is configured to be capable of imaging the object to be measured M with a direction (XY-plane direction) parallel to the placement surface 31 on which the object to be measured M is placed being an imaging direction. Specifically, a surface of the object to be measured M, which is parallel to the Z-direction and perpendicular to the X-direction, can be measured by the image probe 53. With this, it becomes possible to highly accurately measure a surface profile or the like of an inner wall of a cylinder or the like.

The probe supporting mechanism 54 includes a rotational drive unit 60 and a linear drive unit 61. The rotational drive unit 60 is rotatably disposed at the base 51 via, for example, a connection member (not shown). The rotational drive unit 60 is capable of rotating the image probe 53 with a θ-axis extending in the Z-direction that is a direction perpendicular to the placement surface 31 being a rotation axis. A specific configuration of the rotational drive unit 60 is not limited. For example, the rotational drive unit 60 is constituted of a driving source such as a motor, a rotational member that transmits rotational torque, and the like.

The linear drive unit 61 is attached to the rotational drive unit 60. The linear drive unit 61 is capable of moving the image probe 53 along a W-axis extending in one direction. The image probe 53 is attached to the linear drive unit 61 such that a direction of an imaging optical axis is the same as a direction of the W-axis. Thus, the linear drive unit 61 is capable of moving the image probe 53 in the imaging direction. A specific configuration of the linear drive unit 61 is not limited and may be arbitrarily designed.

Figure 4A:
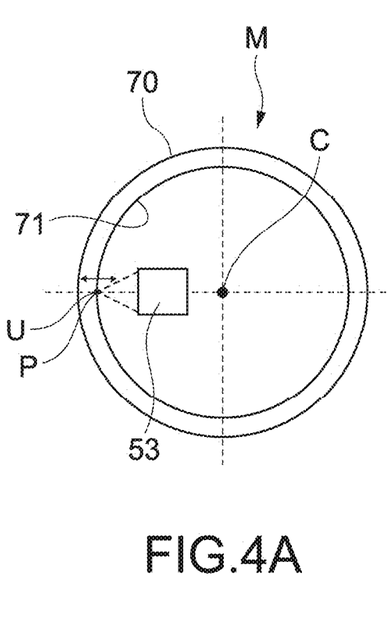
FIGS. 4A and 4B are schematic diagrams for describing an exemplary calculation for shape data of a surface to be measured.
Figure 4B:
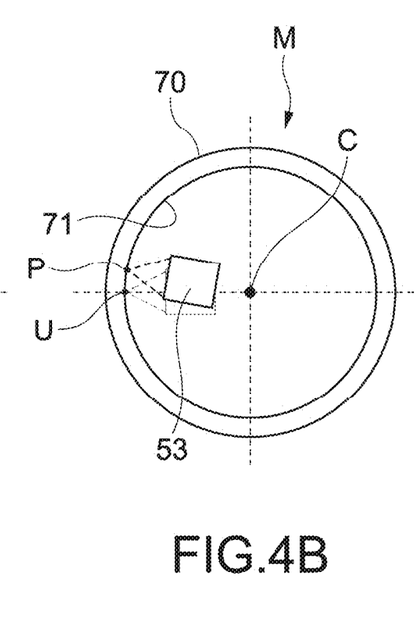

FIGS. 4A and 4B are schematic diagrams for describing an exemplary calculation for the shape data of the surface to be measured that is performed by the three-dimensional coordinate measuring device 100. Hereinafter, the object to be measured M will be referred to as a cylinder block W. The surface to be measured is an inner wall surface 71 of a cylinder 70 of the cylinder block W.

The cylinder block W is measured by the touch probe 52. With this, a height of an upper surface of the cylinder block W, center position C and inner diameter of each cylinder 70, or the like is measured. As shown in FIG. 4A, the image probe 53 is moved on the basis of an offset amount between the both probes such that the focal position P of the image probe 53 is at a predetermined measurement point U on the inner wall surface 71. The offset amount can be calculated in advance by the use of a calibration jig, for example.

A specific method of moving the image probe 53 is not limited. For example, the image probe 53 is disposed at the center position C of the cylinder 70, and the rotational drive unit 60 is rotated such that the W-axis extends toward the measurement point U. Then, the image probe 53 is moved to a position of a predetermined W-coordinate on the W-axis by the linear drive unit 61 for focusing on the measurement point U.

As shown in FIG. 4A, the image probe 53 performs scanning along the W-axis. Moreover, as shown in FIG. 4B, the image probe 53 performs scanning also in a rotation direction of the rotational drive unit 60. With this, it becomes possible to calculate shape data of a region having a center at the measurement point U of the inner wall surface 71. For example, a range to be measured is specified in advance and point cloud data corresponding to the specified range is calculated as the shape data.

In this embodiment, the touch probe 52 and the image probe 53 capable of performing imaging in the XY-plane direction are disposed on the base 51. The image probe 53 is rotated by the rotational drive unit 60 around an axis extending in the Z-direction. Moreover, the image probe 53 is moved by the linear drive unit 61 in the imaging direction. With this, it becomes possible to calculate highly accurately the shape data of the inner wall surface 71 of the cylinder 70 or the like.

[Pit-Surrounding Region]

The inner wall surface 71 of the cylinder 70 is porous. A plurality of oil pits (hereinafter, simply referred to as pits) are formed in the inner wall surface 71 of the cylinder 70. For example, the plurality of oil pits are holes (dimples) each having a diameter of approximately 10 μm to several hundred μm. In measurement of the surface profile of the inner wall surface 71, it is necessary to measure, for example, surface roughness of a plane region in which no pits are formed in addition to the number of pits, the pit shape, and the like. When surface roughness of the entire inner wall surface 71 is measured, the pits are considered as roughness and analyzed, and hence correct data cannot be obtained. In this embodiment, as will be described below, a pit-surrounding region including a pit and its periphery is set and appropriately removed.

Figure 5:
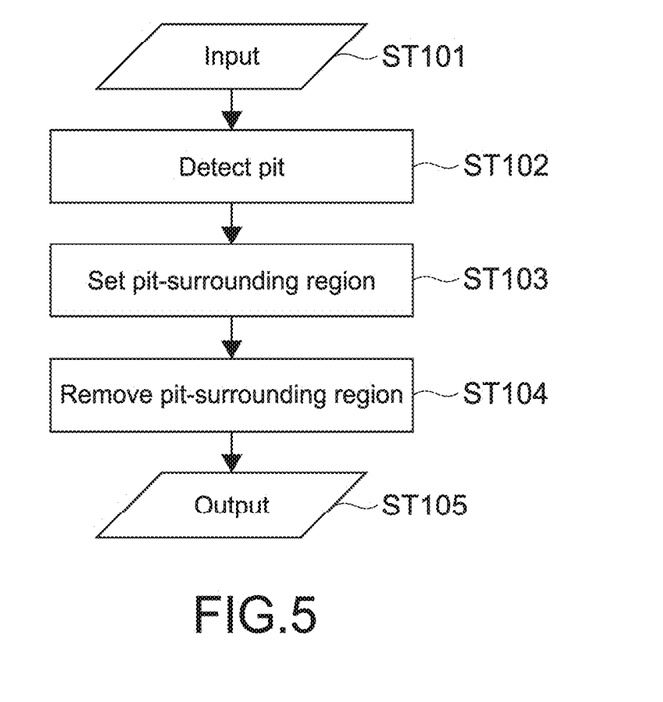
FIG. 5 is a flowchart showing exemplary setting and removing processing for a pit-surrounding region.

FIG. 5 is a flowchart showing exemplary setting and removing processing for the pit-surrounding region. First of all, shape data of the inner wall surface 71 including a plurality of pits is input (Step 101).

Figure 6:
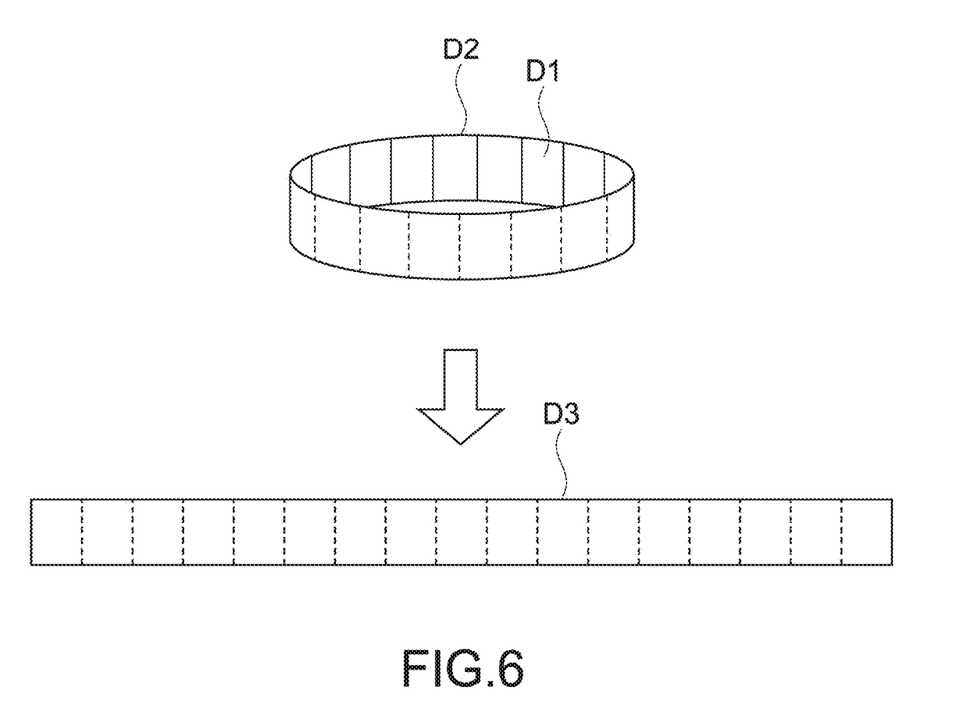
FIG. 6 is a diagram schematically showing exemplary shape data to be input.

FIG. 6 is a diagram schematically showing exemplary input shape data. For example, shape data D1 corresponding to a specified range having a center at a measurement point U set on the inner wall surface 71 is calculated by the three-dimensional coordinate measuring device 100 and the shape data D1 is input into the PC 200. As shown in FIG. 6, shape data items D1 each corresponding to the specified range are combined with one another in a circumferential direction of the inner wall surface 71. As a result, shape data D2 corresponding to the entire circumference of the inner wall surface 71 at a predetermined height is obtained.

The surface measuring unit 212 shown in FIG. 1 develops the shape data D2 corresponding to the entire circumference of the inner wall surface 71 into a plane. As a result, plane shape data D3 is generated. The generated plane shape data D3 is input into the pit-surrounding region setting unit 213 and the pit-surrounding region is set and removed. The development into the plane shape data D3 enables the pit-surrounding region to be highly accurately set and removed. Note that the development into the plane shape data D3 may be performed by the pit-surrounding region setting unit 213.

A method for development into the plane shape data D3 is not limited and any technology may be used. The plane shape data D3 can be generated on the basis of an inner diameter or curvature of the inner wall surface 71, for example. At this time, the plane shape data D3 can be accurately generated by using a measurement value obtained by the touch probe 52 or the image probe 53.

Figure 7A:
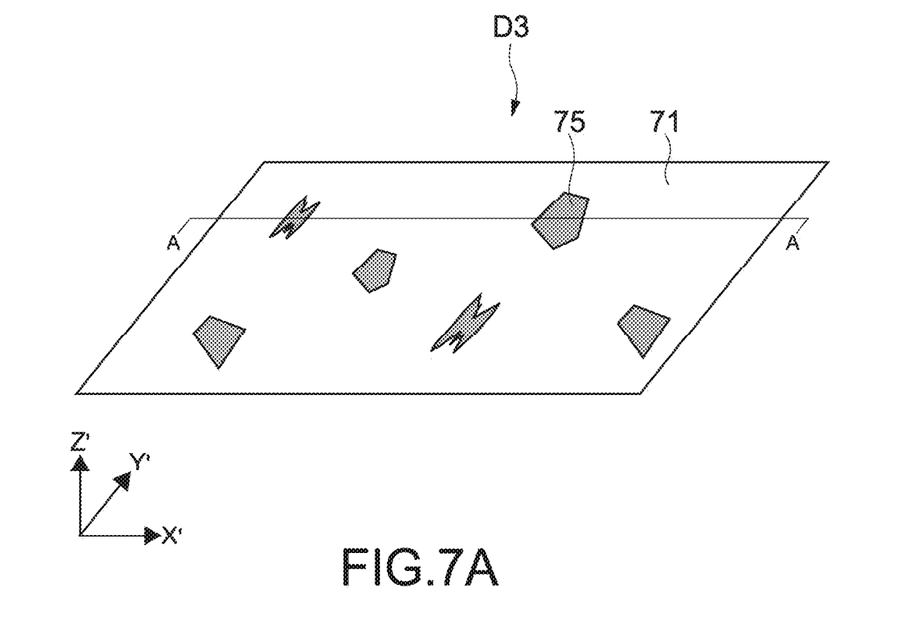
FIGS. 7A and 7B are diagrams schematically showing plane shape data regarding an inner wall surface.
Figure 7B:
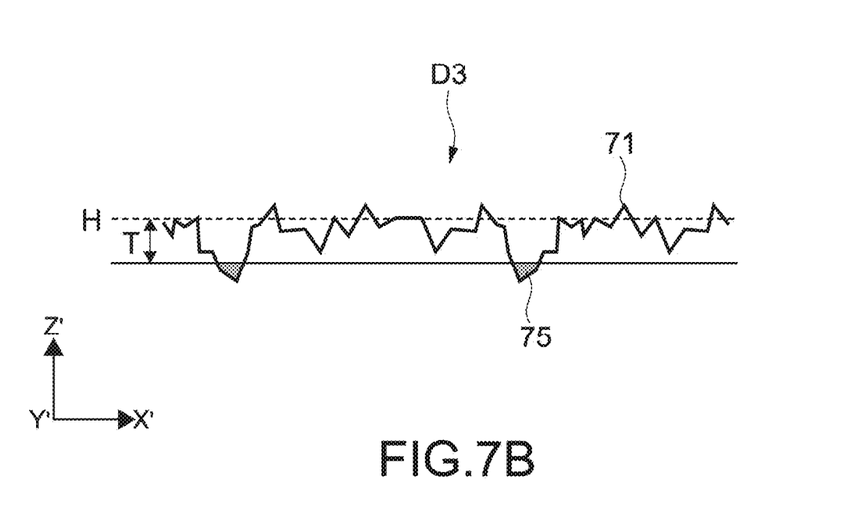

FIGS. 7A and 7B are diagrams each schematically showing the plane shape data D3. FIG. 7B is a cross-sectional view taken along the line A-A of FIG. 7A. A Z'-direction in the figure is a height direction with respect to the plane shape data D3. A height of the plane shape data D3 at each point (measurement point) is a value corresponding to a measurement value in the W-direction shown in FIG. 3.

A plurality of pits 75 in the inner wall surface 71 are detected on the basis of the plane shape data D3 (Step 102). In this embodiment, a reference height H and a threshold T are set and a portion whose height is smaller than the reference height H by the threshold T or more is detected as the pit 75. Thus, a portion lower than a surface parallel to an X'Y'-plane direction is detected as the pit 75, the surface being set at a height smaller than the reference height H by the threshold T or more. With this, it becomes possible to detect the pits 75 with high accuracy.

For example, a mean height of the plane shape data D3 is used as the reference height H. As a matter of course, the reference height H is not limited thereto. A mean height of the plane shape data D3 after filtering processing or the like may be used. Alternatively, the reference height H may be specified by an operator or the like. Any other method may be employed therefor. Also, the value of the threshold T is not limitative and may be arbitrarily set.

Figure 8A:
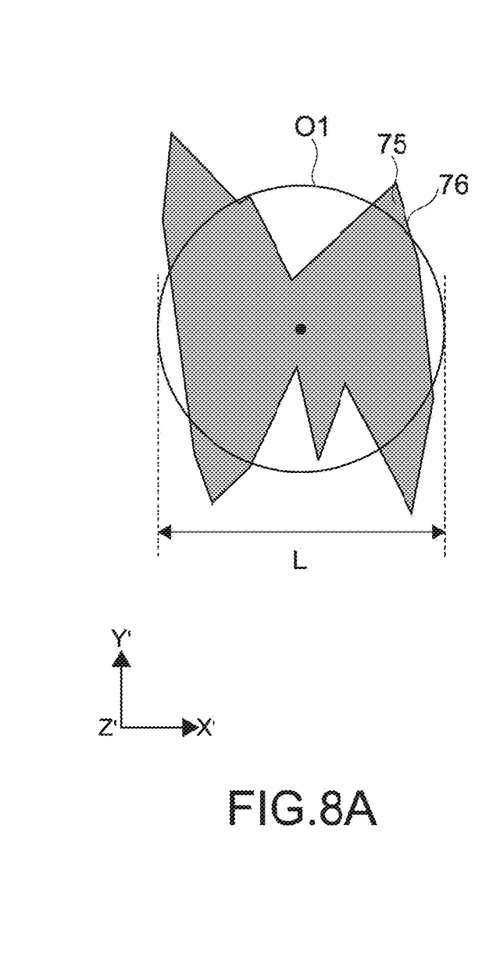
FIGS. 8A, 8B, and 8C are schematic plan views for describing an exemplary setting for the pit-surrounding region.
Figure 8B:
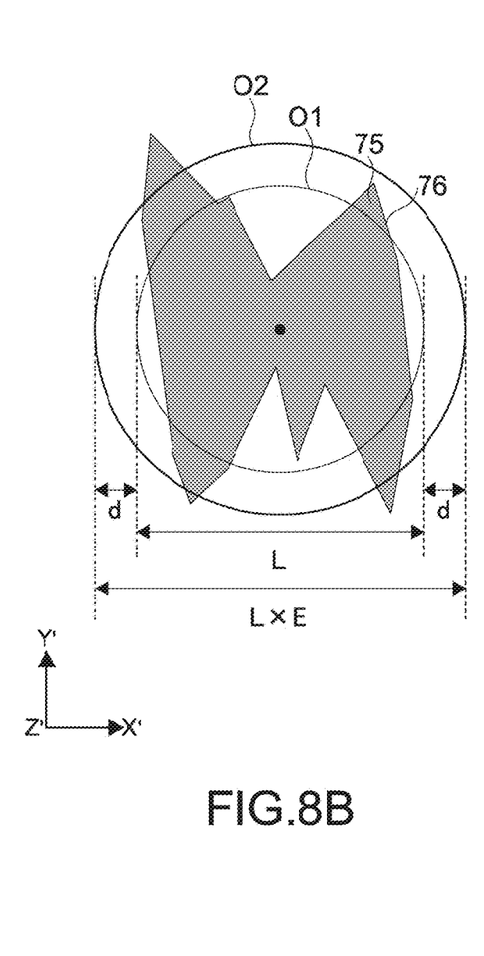
Figure 8C:
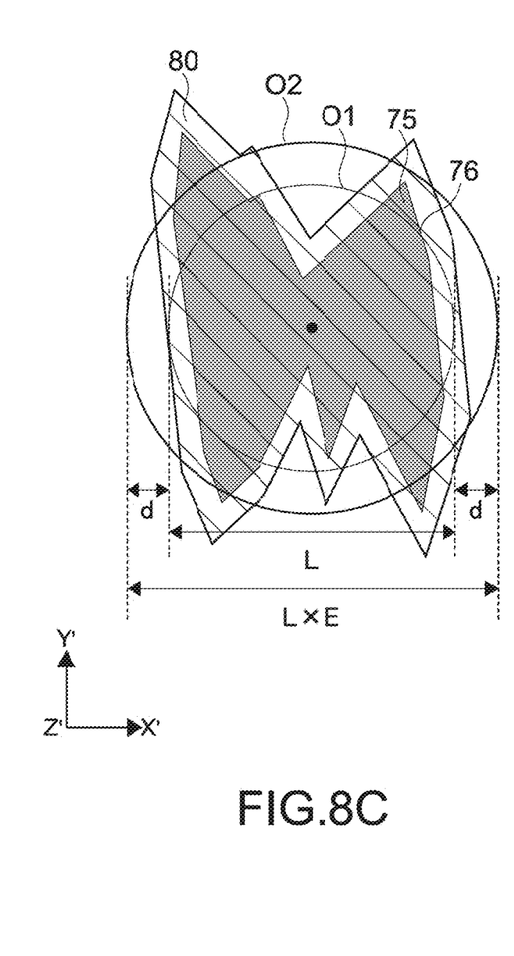
Figure 9:
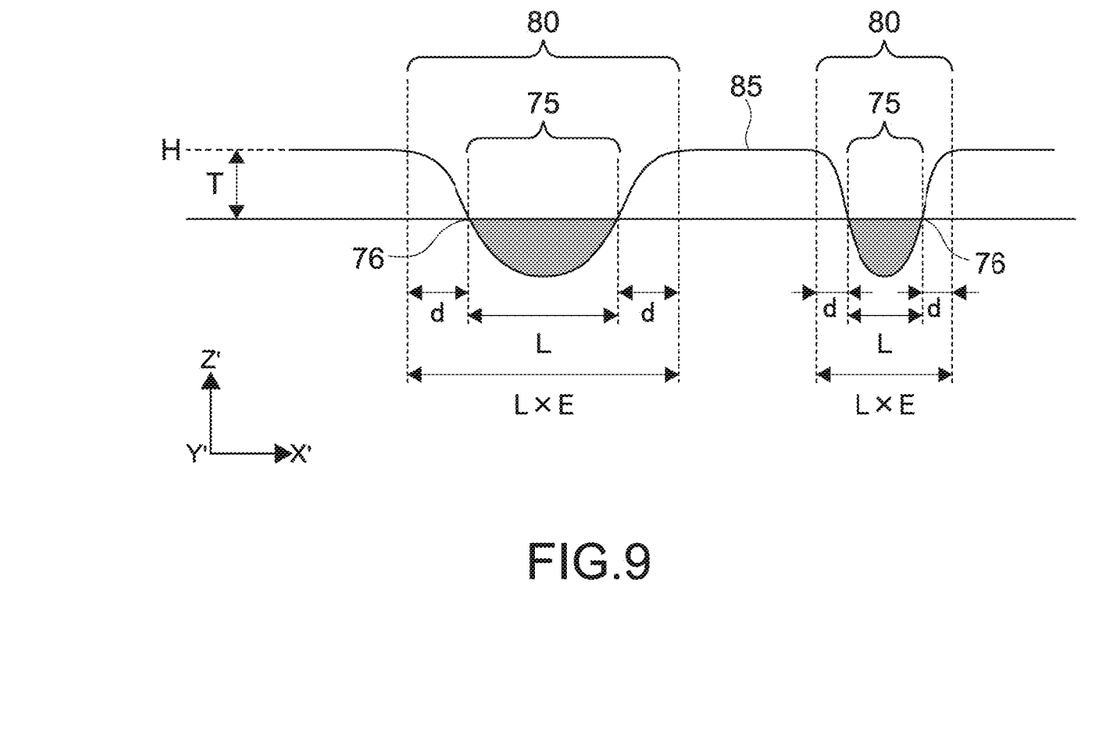
FIG. 9 is a schematic cross-sectional view for describing an exemplary setting for the pit-surrounding region.

A pit-surrounding region 80 is set for each of the detected pits 75 (Step 103). FIGS. 8A to 8C and FIG. 9 are schematic diagrams for describing an exemplary setting for the pit-surrounding region 80. FIGS. 8A to 8C are plan views of the pits 75 and FIG. 9 is a cross-sectional view of the pits 75. In FIG. 9, the shape of each pit 75 is simplified for the sake of easy understanding.

As shown in FIG. 8A, a reference circle O1 having an area approximately equal to the area of the detected pit 75 is set. Assuming that a diameter of the reference circle O1 is a pit diameter L, the pit-surrounding region 80 is set on the basis of the pit diameter L. Note that, as shown in FIG. 9, an actual width of a cross-section of the pit 75 and the pit diameter L are not necessarily equal to each other.

The area of the pit 75 can be calculated according to a well-known technology, for example. For example, when point cloud data items arranged at equal intervals on an X'Y'-plane are used as the plane shape data D3, the area of the pit 75 can be calculated by counting the number of point clouds contained in the pit 75. Otherwise, the area of the pit 75 may be calculated according to an arbitrary technology.

As shown in FIG. 8B, an arbitrary enlargement ratio is set as a surrounding removal ratio E, and the surrounding removal ratio E is multiplied by the pit diameter L. The thus obtained multiplication value L*E corresponds to a diameter of an enlarged circle O2 obtained by enlarging the reference circle O1 with a squared value of the surrounding removal ratio E. Moreover, a value d obtained by subtracting the pit diameter L from the multiplication value L*E shown in FIG. 8B and dividing the thus obtained value by two corresponds to a difference between a radius of the reference circle O1 and a radius of the enlarged circle O2. That is, the value d is a difference between the radius of the reference circle O1 and a multiplication value obtained by multiplying the surrounding removal ratio E by the radius of the reference circle O1. This value d will be referred to as an amount of enlargement d, using the same symbol.

As shown in FIG. 8C, the pit-surrounding region 80 is set by enlarging the edge portion 76 of the pit 75 (intersection point with surface set at reference height) on the basis of the amount of enlargement d. The pit-surrounding region 80 including the entire pit 75, typically, corresponding to the shape of the pit 75 is set.

Figure 10:
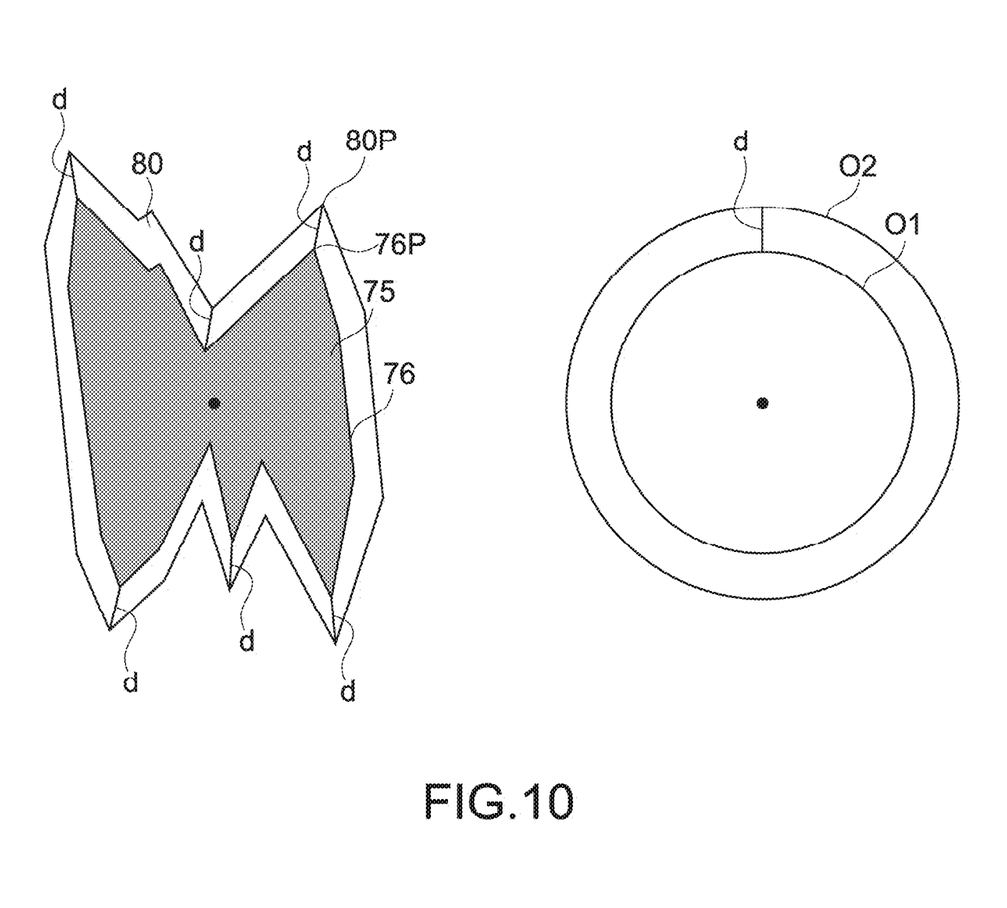
FIG. 10 is a schematic diagram showing an enlarged example of an edge portion of a pit.

FIG. 10 is a schematic diagram showing an exemplary method of enlarging an edge portion 76 of the pit 75 on the basis of the amount of enlargement d. A main point 76P is selected from the edge portion 76 of the pit 75. Enlarged points 80P each obtained by enlarging the point 76P on the basis of the amount of enlargement d are set. The pit-surrounding region 80 is set by connecting the enlarged points 80P to one another correspondingly to the shape of the pit 75. With this, it becomes possible to easily set the pit-surrounding region 80 correspondingly to the shape of the pit 75.

A method of enlarging the edge portion 76 of the pit 75 is not limited and any method may be employed. Note that, when the entire pit 75 is contained in the enlarged circle O2 due to the shape of the pit 75 or the like, the enlarged circle O2 can also be set as the pit-surrounding region 80 (e.g., see FIG. 9).

As shown in FIG. 9, the size of a portion surrounding the pit 75, which may lower the measurement accuracy for surface roughness of a plane region 85, often depends on the pit diameter L. In the method of setting the pit-surrounding region 80 in this embodiment, it is possible to set the pit-surrounding region 80 having an appropriate size in a manner that depends on each pit diameter L. With this, it is possible to sufficiently prevent the plane region 85 from being unnecessarily largely removed, a part of the pit 75 or the pit-surrounding portion from remaining as the plane region 85, etc. As a result, it becomes possible to highly accurately measure the surface roughness of the plane region 85.

As another method of setting the pit-surrounding region 80, the pit-surrounding region 80 may be set to be approximately equal to an area of the enlarged circle O2. That is, the pit-surrounding region 80 having an area approximately equal to a multiplication value obtained by multiplying a predetermined enlargement ratio (squared value of surrounding removal ratio E in this embodiment) by the area of the pit 75 (area of reference circle O1) may be set. With this, it is possible to set the pit-surrounding region 80 having an appropriate size in a manner that depends on the area of each pit 75 (corresponding to pit diameter L).

The pit-surrounding region 80 is removed from the plane shape data D3 (Step 104). For example, the point cloud data of the pit-surrounding region 80 is set as invalid data not used for analyzing the surface roughness. Alternatively, the point cloud data of the pit-surrounding region 80 may be removed from the plane shape data D3. The plane shape data D3 from which the pit-surrounding region 80 has been removed is output to the surface measuring unit 212 and the surface roughness is measured.

Hereinabove, in the inner-wall measuring instrument 500 according to this embodiment, each of the plurality of pits 75 is detected by the PC 200 and the pit-surrounding region 80 is set for each pit 75. With this, it becomes possible to highly accurately measure the surface roughness of the plane region 85 excluding the pit 75 as the surface profile of the inner wall surface 71. Moreover, setting and removing of the pit-surrounding regions 80 are automatically performed on the plurality of pits 75 at once, and hence time necessary for measuring the surface roughness can be greatly reduced. Moreover, as described above, the pit-surrounding region 80 can be appropriately set on the basis of the area of the pit 75, and hence it is possible to sufficiently enhance the measurement accuracy for the surface roughness.

Other Embodiments

The present technology is not limited to the above-mentioned embodiment and various other embodiments can be realized.

Hereinabove, the example in which the plurality of pits are formed as the plurality of recesses has been shown. Then, the reference circle is set as a reference graphic figure for setting the region to be removed (pit-surrounding region). As described above with reference to FIGS. 8A to 8C to 10, the diameter of the reference circle is used as the dimension (size) of the reference graphic figure and the region to be removed can be easily set on the basis of the diameter of the reference circle. Note that the reference graphic figure used for setting the region to be removed is not limited to the circle and any other graphic figure may be used.

Figure 11:
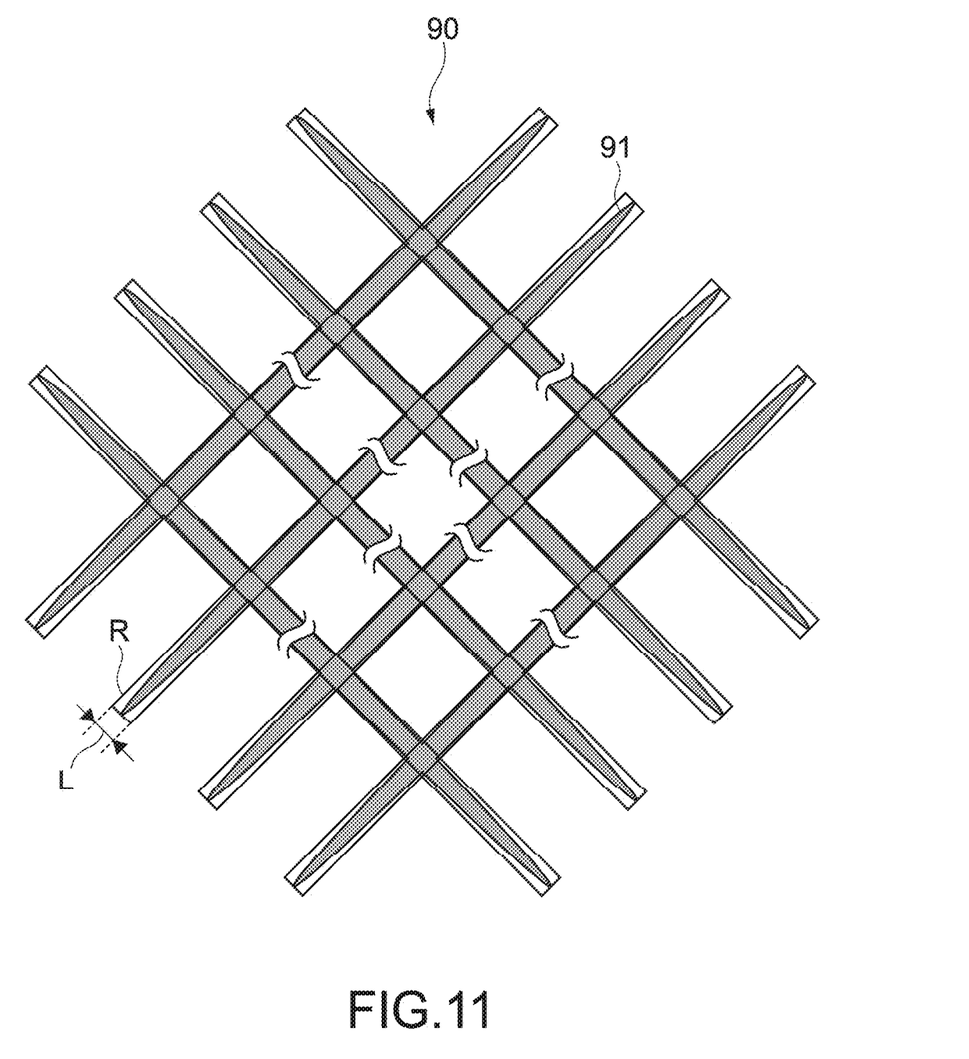
FIG. 11 is a schematic plan view for describing another exemplary setting for the region to be removed.

FIG. 11 is a schematic plan view for describing another exemplary setting for the region to be removed. As schematically shown in FIG. 11, cross-hatched (net-like) grooves 90 can be formed in the cylinder inner wall for retaining oil by honing. When the recesses are the cross-hatched grooves 91, the present technology is also applicable.

In the example shown in FIG. 11, a reference rectangle R extending in an extending direction of each of cross-hatched grooves 91 is set as the reference graphic figure. A width dimension L of the reference rectangle R (size in short-side direction approximately orthogonal to its extending direction) is a dimension of the reference graphic figure and a region to be removed is set on the basis of the width dimension L.

The reference rectangle R is set to have an area approximately equal to an area of each of the cross-hatched grooves 91. The cross-hatched groove 91 has a shape closer to a rectangular shape rather than a circle shape. Thus, a rectangle having a length approximately equal to a length of the cross-hatched groove 91 and a width dimension L approximately equal to a width (size in direction approximately orthogonal to length) of the groove 91 can be easily set as the reference rectangle R.

For example, a maximum value or mean value of widths at points in the length direction may be used as the width of the cross-hatched groove 91. Alternatively, a width at a predetermined point (middle, etc.) in the length direction may be used as the width of the cross-hatched groove 91. A method of setting the reference rectangle R is not limited. For example, an area of the cross-hatched groove 91 may be calculated and the reference rectangle R may be set on the basis of the calculated value.

The region to be removed can be set according to similar processing with the width dimension L of the reference rectangle R shown in FIG. 11, for example, being the pit diameter L shown in FIGS. 8A to 8C or the like. For example, an enlarged rectangle whose width dimension is a multiplication value L*E obtained by multiplying the surrounding removal ratio E by the width dimension L of the reference rectangle R is set. An edge portion of the groove 91 is enlarged on the basis of amount of enlargement that is a value obtained by subtracting the width dimension L of the reference rectangle R from the width dimension of the enlarged rectangle and dividing it by two. With this, the region to be removed can be easily set corresponding to the shape of the groove 91. The cross-hatched groove 91 is closer to the rectangle as described above, and hence the enlarged rectangle contains the entire groove 91 in many cases. In this case, the enlarged rectangle can be easily set as the region to be removed. Otherwise, an arbitrary method in which the width dimension L of the reference rectangle R is used as a reference may be employed.

The three-dimensional coordinate measuring device 100 and the PC 200 shown in FIG. 1 may be integrally configured. In this case, an input/output interface or the like provided within the instrument functions as an input unit. As a matter of course, the input unit may be configured by a software block.

A height that is a threshold for detecting the pit may be set instead of the reference height. A portion lower than the height that is such a threshold is detected as a pit.

The present technology is also applicable to a surface to be measured other than the inner wall surface including the plurality of pits or the cross-hatched grooves. That is, the present technology is applicable to shape data items of various surfaces to be measured that are measured by an arbitrary measuring instrument different from the inner-wall measuring instrument shown in FIG. 1.

It becomes possible to highly accurately measure surface roughness of, for example, a plane region of a surface to be measured in which a plurality of recesses are intentionally formed for a predetermined purpose or a plane region of a surface to be measured in which a plurality of recesses are unintentionally formed. As a matter of course, processing other than the surface-roughness measurement may be performed on the plane region. In addition, predetermined measurement or the like may be performed on the region to be removed including the recess.

At least two of the characteristic parts of the above-mentioned embodiments may be combined. Moreover, the above-mentioned various effects are merely examples and not limitative and other effects may be produced.

What is claimed is:

1. A measuring apparatus, comprising:
    one or more probes configured to acquire shape data of a surface of a cylindrical physical object to be measured, the one or more probes being operably coupled to a rotational driver and a linear driver, the linear driver configured to move the one or more probes in an inward or outward radial direction with respect to a center position of the cylindrical physical object to be measured, the rotational driver and the linear driver configured to image an inner side wall surface of the cylindrical physical object to be measured while maintaining a constant radial distance from the center position of the cylindrical physical object to be measured, the surface of the cylindrical physical object to be measured including a plurality of recesses,
    a processor, and
    a memory storing thereon instructions, which when executed by the processor, causes the processor to perform operations including:
        receiving the shape data of the surface to be measured including the plurality of recesses;
        detecting each of the plurality of recesses on the basis of the received shape data; and
        setting, for one or more detected recess of the plurality of recesses, a region to be removed including the recess,
    wherein the surface to be measured including the plurality of recesses is the inner side wall of the cylindrical physical object.

2. The measuring apparatus according to claim 1, wherein the region to be removed is set on the basis of an area of the detected recess.

3. The measuring apparatus according to claim 2, further comprising:
    setting a reference graphic figure having an area approximately equal to the area of the detected recess, wherein the region to be removed is further set on the basis of a dimension of the reference graphic figure.

4. The measuring apparatus according to claim 3, further comprising:
    setting, as the region to be removed, a region obtained by enlarging the recess on the basis of an amount of enlargement that is a difference between the dimension of the reference graphic figure and a multiplication value obtained by multiplying a predetermined enlargement ratio by the dimension of the reference graphic figure.

5. The measuring apparatus according to claim 3, wherein the reference graphic figure is a circle having an area approximately equal to the area of the detected recess, and the dimension is a diameter of the circle.

6. The measuring apparatus according to claim 3, wherein the reference graphic figure is a rectangle having a width approximately equal to a width of the recess, and the dimension is a width dimension of the rectangle.

7. The measuring apparatus according to claim 2, wherein the region to be removed is set such that a multiplication value obtained by multiplying a predetermined enlargement ratio by the area of the detected recess is approximately equal to an area of the region to be removed.

8. The measuring apparatus according to claim 1, further comprising:
    setting a reference height to the shape data of the surface to be measured; and
    detecting, as the recess, a portion whose height is smaller than the reference height by a predetermined threshold or more.

9. The measuring apparatus according to claim 8, further comprising:
    developing the input shape data into a plane;
    setting the reference height to the developed shape data; and
    detecting the recess.

10. The measuring apparatus according to claim 8, wherein the reference height is a mean height of the surface to be measured, which is calculated on the basis of the shape data.

11. The measuring apparatus according to claim 1, further comprising:
    causing the one or more probes to measure a surface roughness of a region excluding the set region to be removed.

12. A measuring method, comprising:
    by a computer, acquiring shape data of a surface of a cylindrical physical object to be measured by one or more probes, the one or more probes being operably coupled to a rotational driver and a linear driver, the linear driver configured to move the one or more probes in an inward or outward radial direction with respect to a center position of the cylindrical physical object to be measured, the rotational driver and the linear driver configured to image an inner side wall surface of the cylindrical physical object to be measured while maintaining a constant radial distance from the center position of the cylindrical physical object to be measured, the surface of the cylindrical physical object including a plurality of recesses;

detecting each of the plurality of recesses on the basis of the acquired shape data; and setting, for the detected recess, a region to be removed including the recess, wherein the surface to be measured including the plurality of recesses is the inner side wall of the cylindrical physical object.

13. A non-transitory computer readable recording medium that records a program that causes a processor to perform operations including:

acquiring shape data of a surface of a cylindrical physical object to be measured by one or more probes, the one or more probes being operably coupled to a rotational driver and a linear driver, the linear driver configured to move the one or more probes in an inward or outward radial direction with respect to a center position of the cylindrical physical object to be measured, the rotational driver and the linear driver configured to image an inner side wall surface of the cylindrical physical object to be measured while maintaining a constant radial distance from the center position of the cylindrical physical object to be measured, the surface of the cylindrical physical object including a plurality of recesses;

detecting each of the plurality of recesses on the basis of the acquired shape data; and setting, for the detected recess, a region to be removed including the recess, wherein the surface to be measured including the plurality of recesses is the inner side wall of the cylindrical physical object.

14. A measuring apparatus comprising:

one or more probes configured to acquire shape data of a surface of a cylindrical physical object to be measured, the one or more probes being operably coupled to a rotational driver and a linear driver, the linear driver configured to move the one or more probes in an inward or outward radial direction with respect to a center position of the cylindrical physical object to be measured, the rotational driver and the linear driver configured to image an inner side wall surface of the cylindrical physical object to be measured while maintaining a constant radial distance from the center position of the cylindrical physical object to be measured, the surface of the cylindrical physical object to be measured including a plurality of recesses, a processor, and a memory storing thereon instructions, which when executed by the processor, causes the processor to perform operations including:

receiving the shape data of the surface to be measured including the plurality of recesses;

detecting each of the plurality of recesses on the basis of the received shape data;

setting, for one or more detected recess of the plurality of recesses, a region to be removed including the recess;

setting a reference height to the shape data of the surface to be measured; and detecting, as the recess, a portion whose height is smaller than the reference height by a predetermined threshold or more, wherein the surface to be measured including the plurality of recesses is the inner side wall of the cylindrical physical object and includes a plurality of pits.

* * * * *